United States Patent Office 3,150,070
Patented Sept. 22, 1964

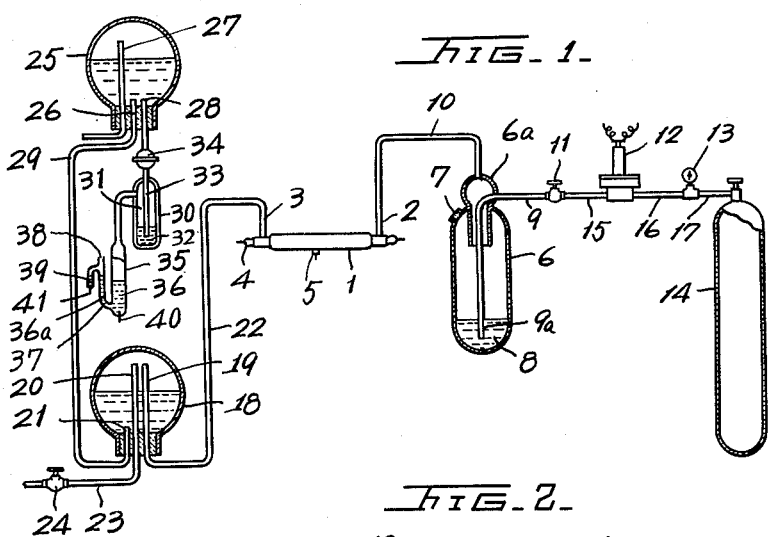
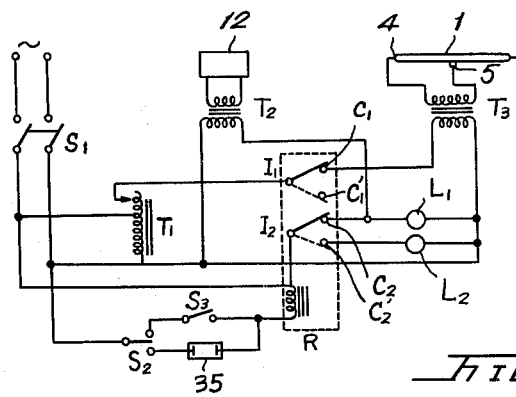
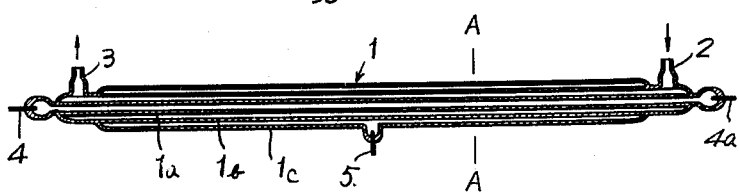

3,150,070
MEDICAL OZONE GENERATION APPARATUS
Masahiko Ogawa, 1273 Yoyogi Uehara-machi,
Shibuya-ku, Tokyo, Japan
Filed Jan. 23, 1962, Ser. No. 168,177
9 Claims. (Cl. 204—316)

The present invention relates to improvements in apparatus for the generation of high purity ozone which is to be utilized for medical treatment purposes.

The novel ozone generation apparatus according to the present invention comprises an oxygen supply device which is designed to supply chemically high purified oxygen into an ozone generation mechanism, the generation mechanism being designed to ozonize the oxygen supplied from said supply device and which comprises an ozone generation chamber and two neon electrode tubes, said chamber and two electrodes being concentrically disposed, an interlocking mechanism which is designed to connect an ozone reservoir tank with a hydraulic tank having a pressure operated switch and an electric mechanism which is designed to automatically control the operation of said ozone generation mechanism by means of said pressure operated switch.

One feature of the apparatus according to the present invention is that said ozone generation mechanism which constitutes one of the essential component parts of said apparatus consists of a silica tube, an inner electrode tube containing a small amount of neon gas sealed therein and an outer electrode tube encircling said silica tube in order to ozonize the oxygen charged in said ozone generation chamber by corona discharge between said two electrode tubes. Said electrode tubes can also be made of silica, but will be referred to herein as inner and outer electrode tubes, for convenience. The present apparatus can be operated at a quite low temperature, and furthermore, since said apparatus does not require the metallic plate electrodes which have been necessary in the prior art ozone generation apparatus, the electrodes are free from any oxidation. This fact ensures a long service life and easy handling and maintenance for the apparatus.

Another feature of the novel ozone generation apparatus of the present invention is that chemically high purity oxygen is supplied through a glass made check valve mechanism containing silicone oil therein into an ozone generation mechanism and the dispersion of ozone into the oxygen can be effectively prevented by means of said check valve mechanism whereby the ozone supplied into an ozone reservoir tank becomes high purified ozone, which can be satisfactorily employed for medical purposes.

Still another feature of the novel apparatus under consideration is that in said apparatus a glass made ozone reservoir tank being connected with a glass made hydraulic tank disposed above said reservoir tank; a pressure switch being disposed below said hydraulic tank and connected through a pressure chamber with said hydraulic tank, said pressure switch being adapted to automatically control the operation of a magnetic valve of an oxygen supply device and the discharge operation of an ozone generation mechanism in accordance with a variation in the ozone amount within said ozone reservoir tank whereby the ozone within said reservoir tank can be always maintained under hydraulic pressure resulting in the ozone being quite easily discharged out of the apparatus for its intended purpose; decrease in ozone amount due to discharge thereof being adapted to cause a decrease in the hydraulic pressure within said hydraulic tank and the change in the hydraulic pressure being adapted to be transformed into an air pressure change, which enables the use of an air pressure operated switch with a simple construction and simplifies the construction of the control circuit.

The above features of the present invention make it possible to construct an ozone generation apparatus of compact, light-weight and low price and to produce highly purified medical ozone in a quite simple way by the employment of the thus constructed apparatus, and therefore, it can be said that the present invention has provided an ozone generation apparatus which can satisfy all the requirements for an ozone generation apparatus.

Still other objects, features and attendant advantages will become apparant to those skilled in the art from a reading of the following detailed description of a preferred embodiment constructed according to the present invention.

In the drawings:

FIG. 1 is a schematic view of an ozone generation apparatus according to the present invention with its electrical circuit eliminated therefrom for clarification purpose.

FIG. 2 is a diagrammatic view of electrical components which constitute part of said apparatus.

FIG. 3 is a schematic view of an ozone generation mechanism employed in said apparatus.

FIG. 4 is an enlarged sectional view taken along the line A—A of FIG. 3.

Referring first to FIG. 1 wherein numeral 1 generally designates an ozone generation mechanism of which detailed explanation will be made hereinafater, 2 an inlet port for material oxygen, 3 an outlet port for generated ozone, 4 and 5 electrodes respectively, 6 a check valve mechanism which is designed to prevent reverse-flow of the ozone generated in said generation mechanism 1 and which has been formed from a glass material vessel and 7 a plug for sealing said check valve mechanism 6. A cap-shaped member 6a is secured to the top of said valve mechanism 6 and said oxygen inlet port 2 is connected through a piping 10 with said cap-shaped member 6a. Said glass vessel 6 contains a small amount of ozone resistant liquid 8 such as silicone oil therein for example and the forward end 9a of an oxygen supply tube 9 is immersed into said liquid 8. Numeral 11 designates an oxygen gas supply control valve which is disposed at said supply tube 9, 12 a magnetic valve, 13 a gas pressure regulator, 14 an oxygen bomb and these members are mutually connected by means of pipings 15, 16 and 17. The above are a general outline of the ozone generation mechanism and the material oxygen supply device which serves the former.

Next, turning to the ozone reservoir device which is adapted to store the ozone generated in the ozone generation mechanism 1 and the pressure-operated switch mechanism which is provided within said ozone reservoir device, in FIG. 1, numeral 18 designates an ozone reservoir tank in which water is contained and which is formed from glass material. A glass tube 19 is disposed within said ozone reservoir tank 18 and the upper portion of said tube 19 extends upwardly from the surface of the water in the ozone reservoir tank 18. Said glass tube 19 connects with a piping 22 which draws the ozone through an outlet 3 of the ozone generation tube 1 mechanism into said reservoir tank 18. Similarly, a glass tube 20 is disposed within said ozone reservoir tank 18 and the upper portion of said tube 20 extends upwardly from the surface of the water within the ozone reservoir tank 18. Said tube 20 connects with a piping 23 having a cock 24 for taking out ozone from said reservoir tank 18. A hydraulic tank 25 is disposed above the ozone reservoir tank 18 and which hydraulic tank 25 is formed from glass material. A glass tube 26 extends into the water within said hydraulic tank 25 from the bottom thereof. Said tube 26 connects through a piping 29 with a glass tube 21 which extends into the water within the ozone reservoir tank 18. In FIG. 1 numeral 27 designates an overflow pipe for said hydraulic tank 25, 28 a conductor pipe which connects a glass made pressure chamber 30 with the hydraulic tank 25. Said pressure chamber 30 is provided with a glass tube 33 therein and said tube 33 is disposed to extend into the water 32 contained within the pressure chamber 30, the level of said water 32 fluctuating depending upon any change in the water level of the hydraulic tank 25. The glass tube 33 is detachably connected through a linking means 34 with the conductor pipe 28. A pressure switch or a mercury switch 35 is communicated into the air zone 31 of the pressure chamber 30 and a mercury mass 36 is charged within said pressure switch 35. The air pressure within the pressure chamber 30 acts on said mercury mass 36. A side pipe 37 is connected with the mercury switch 35 and a mercury mass 36a is contained within said side pipe 37. The mercury mass 36a is subjected to the atmospheric pressure through an opening 38 of the side pipe 37. A mercury mass 39 is charged within a branch pipe of the side pipe 37. Numerals 40 and 41 respectively designate contact members which contact with the mercury masses 36 and 39 respectively. In case the pressure within the pressure chamber 30 increases, the mercury mass 36 is pressurized so as to connect between the mercury masses 36 and 39 whilst the contact members 40 and 41 shortcircuit. On the other hand, in case the pressure within the pressure chamber 30 decreases, the mercury mass 36 rises up so as to separate the mercury mass 36a from the mercury mass 39 whereby the contact members 40 and 41 open.

FIG. 2 illustrates an electric circuit employed in the above mentioned apparatus. In this figure, character S1 designates a main electric source switch, S2 a changeover switch, S3 a hand operated switch, 35 the mercury switch mentioned in connection with FIG. 1, and R a relay which is adapted to operate by the closure of the hand operated switch S3 or the mercury switch 35 and said relay R has movable contact members $I_1$ and $I_2$ which connect with constantly closed contact points $C_1$ and $C_2$ respectively. The actuation of this relay R causes its movable contact members $I_1$ and $I_2$ to shift from their contact with the respective contact points $C_1$ and $C_2$ to contact points $C'_1$ and $C'_2$ respectively. In this figure, character $T_1$ designates a variable resistor connected with a main electric source and one frictionally movable terminal of said variable resistor $T_1$ is connected with the movable contact member $I_1$ and the other terminal thereof is connected with one terminal of a transformer $T_2$ which connects with a magnetic valve 12 and connects with one terminal of a transformer $T_3$ which connects with the ozone generation mechanism 1. The other terminal of said transformer $T_3$ is connected with the contact point $C_1$ and the other terminal of said transformer $T_2$ is connected with the contact point $C_2$. Characters $L_1$ and $L_2$ respectively designate pilot lamps which connect with the contact points $C_2$ and $C'_2$ respectively.

FIGS. 3 and 4 respectively show the details of the ozone generation mechanism 1 employed in the ozone generation apparatus according to the present invention. Said mechanism 1 comprises a hard glass tube ozone generation chamber. In these figures, 1a designates an inner silica electrode tube wherein a small amount of neon gas is sealed and at the opposite ends thereof electrodes 4 and 4a are respectively provided. Numeral 1b designates an ozone generation chamber having an oxygen inlet 2 and an ozone outlet 3 respectively adjacent the opposite ends thereof, both ends of said chamber 1b being welded to said inner electrode tube 1a. An outer annular electrode is defined by an outer tube 1c and the silica tube 1b, the outer tube 1c having a centrally disposed electrode 5 and a little amount of neon gas contained therein disposed around said chamber 1b. The outer electrode 1c encircles the concentrically ozone generation chamber 1b and its both ends are welded to the outer periphery of said ozone generation chamber 1b. Accordingly, when oxygen is supplied through the inlet port 2 into the ozone generation chamber 1b and a high voltage is applied on the inner and outer electrode tubes 1a and 1c, said two electrode tubes are caused to discharge so as to cause corona discharge within the ozone generation chamber 1b whereby ozone is generated.

In the operation of the ozone generation apparatus according to the present invention, the frictionally movable terminal of the variable resistor $T_1$ is first adjusted so that the output voltage of said resistor $T_1$ will be made zero, and then the main electric source switch $S_1$ is caused to close its circuit. Thereupon, the pilot lamp $L_1$ lights so as to actuate the magnetic valve 12, but in this case, no voltage is applied on the ozone generation mechanism 1. As the voltage of the variable resistor $T_1$ is gradually increased, a voltage is applied through the movable contact member $I_1$ and the contact point $C_1$ of the relay R on the transformer $T_3$ whereby the ozone generation mechanism 1 initiates discharge.

Thereafter the gas regulator 13 is adjusted so that oxygen under a suitable pressure is supplied through the magnetic valve 12 to the control valve 11 through which a suitable amount of oxygen is fed via the check valve mechanism 6 into the ozone generation mechanism 1. In this case, the oxygen passes through the oxygen supply pipe 9 and jets into the silicone oil within the check valve mechanism 6, and then the oxygen rises up through the silicone oil to be fed into the ozone generation mechanism 1. Accordingly, the ozone generated in the ozone generation mechanism 1 is prevented from counterflowing into the oxygen supply pipe 9 by virtue of the silicone oil.

The ozone generated in the ozone generation mechanism 1 is supplied into the ozone reservoir tank 18 where the ozone pushes up the water in said tank 18 into the hydraulic tank 25, and the ozone is stored in the tank 18. When a desired amount of ozone has been stored within the ozone reservoir tank 18, the changeover switch $S_2$ is shifted to the hand operated switch $S_3$ so as to close the circuit of said switch $S_3$ whereby the relay R is energized to cause the movable contact members $I_1$ and $I_2$ to contact points $C'_1$ and $C'_2$ respectively. Accordingly, since the electric circuits of the transformers $T_2$ and $T_3$ close, the magnetic valve 12 closes and at the same time the ozone generation mechanism 1 ceases its discharge.

In the above operation, the air zone 31 of the pressure chamber 30 which connects with the conductor tube 28 of the hydraulic tank 25 is subjected to hydraulic pressure in proportion to the ozone amount within the ozone reservoir tank 18. Therefore, the mercury mass 36 of the mercury switch 35 is pushed down by the air pressure of the air zone 31 so as to contact the mercury mass 36a with the mercury mass 39 whereby the electrodes 40 and 41 are caused to short-circuit, and in case the change-over switch $S_2$ is shifted to the mercury switch 35 for circuit closing when a predetermined amount of ozone has been stored in the ozone tank 18, the same conditions are maintained as in case the hand operated switch $S_3$ is closed.

Thereafter, when the discharge cock 24 is turned round so as to discharge the ozone out of the system, the ozone amount within the ozone reservoir tank 18 decreases, and the air pressure within the pressure chamber 30 which is contacted by the hydraulic tank 25 also decreases, and the mercury mass 36 of the mercury switch 35 rises up and the mercury masses 36a and 39 separate from each other whereby the current flow across the relay R is blocked. Therefore, the movable contact members $I_1$ and $I_2$ return to their original positions as shown with the full line in FIG. 2 so as to actuate the magnetic valve 12 and at the same time to cause the ozone generation mechanism 1 to initiate discharge. When the ozone amount within the ozone reservoir tank 18 has decreased below a predetermined amount, oxygen is automatically replenished into the ozone generation mechanism 1 and the generated ozone is stored within the ozone reservoir tank 18. When a predetermined amount of ozone has been stored within the reservoir tank 18, the supply of oxygen into the generation mechanism 1 is automatically stopped so as to cause the ozone generation mechanism to discontinue its discharge. The above operations are repeated depending upon the ozone amount within the ozone reservoir tank 18.

In order to detect any variation in the hydraulic pressure within the hydraulic tank 25, other types of conventional pressure-actuated switches may be used. For instance, a bellow type switch may be employed in place of the mercury switch as illustrated. Even in such a case, the ozone generation apparatus according to the present invention can function in the same way.

It will be understood that minor modifications and improvements may be made by those skilled in the art without departing from the scope and spirit of my invention. Accordingly, the invention is not to be limited to the precise embodiment illustrated herein, but only by the scope of the appended claims.

Having described my invention, that which is claimed is:

1. An ozone generation and supply apparatus, comprising a source of oxygen supply, a first conduit leading therefrom, a magnetic valve and a check valve in said first conduit, an ozone generation mechanism connected to said conduit, said ozone generation mechanism comprising an ozone generation chamber embodying two concentrically disposed cylindrical tube gas electrodes and being adapted to ozonize the oxygen supplied from said oxygen supply device, an ozone reservoir for storing the generated ozone, a second fluid conduit connecting said ozone generation chamber and said ozone reservoir device, a hydraulic tank with a fluid connection to said reservoir device, a pressure operable switch, means including a liquid conduit connection from said hydraulic tank adapted to transform variations in hydraulic pressure in said tank into variations in gas pressure and means for applying the latter to said switch, and electric circuitry means connected to said switch adapted to control automatically the opening-closing operation of said magnetic valve and the operation of said ozone generation mechanism in accordance with a change in the ozone amount within said ozone reservoir device.

2. An ozone generation apparatus as set forth in claim 1 in which said means for applying pressure to said switch includes an auxiliary pressure chamber having liquid in the bottom thereof and a tube connecting the liquid therein with the liquid in said tank, said auxiliary chamber also having a tube connecting the upper gas containing part to the switch operating means thereby to control the switch in accordance with variations in hydraulic pressure from said tank.

3. A medical ozone generation apparatus as set forth in claim 2 in which said switch comprises a mercury switch provided with three glass tubes comprising a main switch tube, a side tube and a branch tube each of said tubes containing a mercury mass therein, respectively, said mercury mass of the main switch being subjected to the gas pressure from said pressure chamber and those of said side and branch tubes communicating into the atmosphere, the mercury mass of the main switch and that of the side tube communicating with each other at their lower portions, a first electrode communicating with the juncture of said two mercury masses, a second electrode being connected with the bottom of the mercury mass in the branch tube, whereby both electrodes are caused to close when the air pressure of the pressure chamber exceeds a pre-set value and are caused to open when said air pressure decreases below said pre-set value.

4. A medical ozone generation apparatus as set forth in claim 1 in which said electric circuitry embodies a relay and transformer, said relay having two movable contact members and two pairs of fixed contact points each pair of which are associated with each one of said movable contact members and are alternately contacted by the corresponding contact members and said relay contacts through a change over switch with a hand operated switch or said pressure switch, and said apparatus further comprising an electric control mechanism whereby by the opening of said hand operated switch or pressure switch, said movable contact members are caused to contact with one of their corresponding fixed contact points so as to actuate said magnetic valve and at the same time to supply a high voltage through said transformer into said ozone generation mechanism, and by the closure of said hand operated switch or pressure switch, the operation of said ozone generation mechanism and magnetic valve is stopped.

5. An ozone generation apparatus as set forth in claim 1 in which the ozone generation chamber is located between an inner silica tube electrode and an outer silica tube electrode encircling said inner electrode, said two electrodes containing a small amount of neon gas therein and being concentrically disposed, the opposite ends of said ozone generation chamber being connected to said oxygen supply first conduit and said second conduit respectively.

6. An ozone generation apparatus as set forth in claim 1 in which said check valve embodies a container having silicone oil therein, and the conduit portion leading from said source of oxygen has an open end immersed in said silicone oil, and oxygen is drawn off the top above said oil through another portion of the conduit.

7. An ozone generation apparatus as set forth in claim 1 in which said ozone reservoir has two tubes upwardly extending from the bottom thereof one of which is connected with the ozone outlet of said ozone generation chamber and the other comprises an ozone discharge line having a control valve therein, and a third tube connected with said hydraulic tank which is disposed above for applying hydraulic pressure, said hydraulic tank having an overflow pipe which extends through the water contained therein to communicate into the atmosphere.

8. In a medical ozone generation apparatus having an oxygen supply device for supplying high purified oxygen through a magnetic valve and a check valve mechanism into an ozone generation mechanism, said ozone generation mechanism comprising an ozone generation chamber and two coaxial cylindrical neon electrodes to ozonize the oxygen supplied from said oxygen supply device, and an ozone reservoir for storing the generated ozone, characterized by that said apparatus further comprises a hydraulic tank operatively connected with said reservoir, the pressure chamber being disposed below said hydraulic tank with fluid connections to said tank to transform variations in hydraulic pressure within said hydraulic tank into variations in air pressure in accordance with any change in the amount of ozone within the ozone reservoir, electric circuitry including a relay mechanism connected to said magnetic valve, and a pressure operated switch connected with said pressure chamber whereby the operation of the pressure switch controls said relay mechanism to actuate automatically the magnetic valve for opening and closing thereof and the ozone generation mechanism for initiating and terminating the discharge operation thereof.

9. In an apparatus for supplying high purity ozone, a supply of oxygen under pressure, an ozone generating apparatus having an inlet and an outlet port, a conduit connecting said source of oxygen with said inlet port, said conduit having a magnetically responsive valve adapted to close said conduit, an ozone storage closed vessel adapted to storage of ozone by displacement of water from said closed vessel and a second conduit connecting said outlet port with said ozone storage closed vessel, a hydraulic tank comprising a closed vessel adapted to contain a liquid portion and a gaseous portion thereabove, a third conduit connecting the bottom of said reservoir with the bottom of said hydraulic tank, a pressure operated switch responsive to the pressure in said hydraulic tank, said pressure operated switch being operatively connected to said magnetic valve to open and close said valve in response to decreased or increased pressure within said hydraulic tank whereby supply of oxygen to said ozone generating apparatus is controlled with relation to changes in the amount of ozone in said ozone reservoir.

References Cited in the file of this patent
UNITED STATES PATENTS 2,812,861    Bickford _____ Nov. 12, 1957

FOREIGN PATENTS 779,735    France _____ Apr. 11, 1935

OTHER REFERENCES

La Coux: L'Ozone et ses Application Industrielles (1904), page 142.